United States Patent Office 3,533,275
Patented Oct. 13, 1970

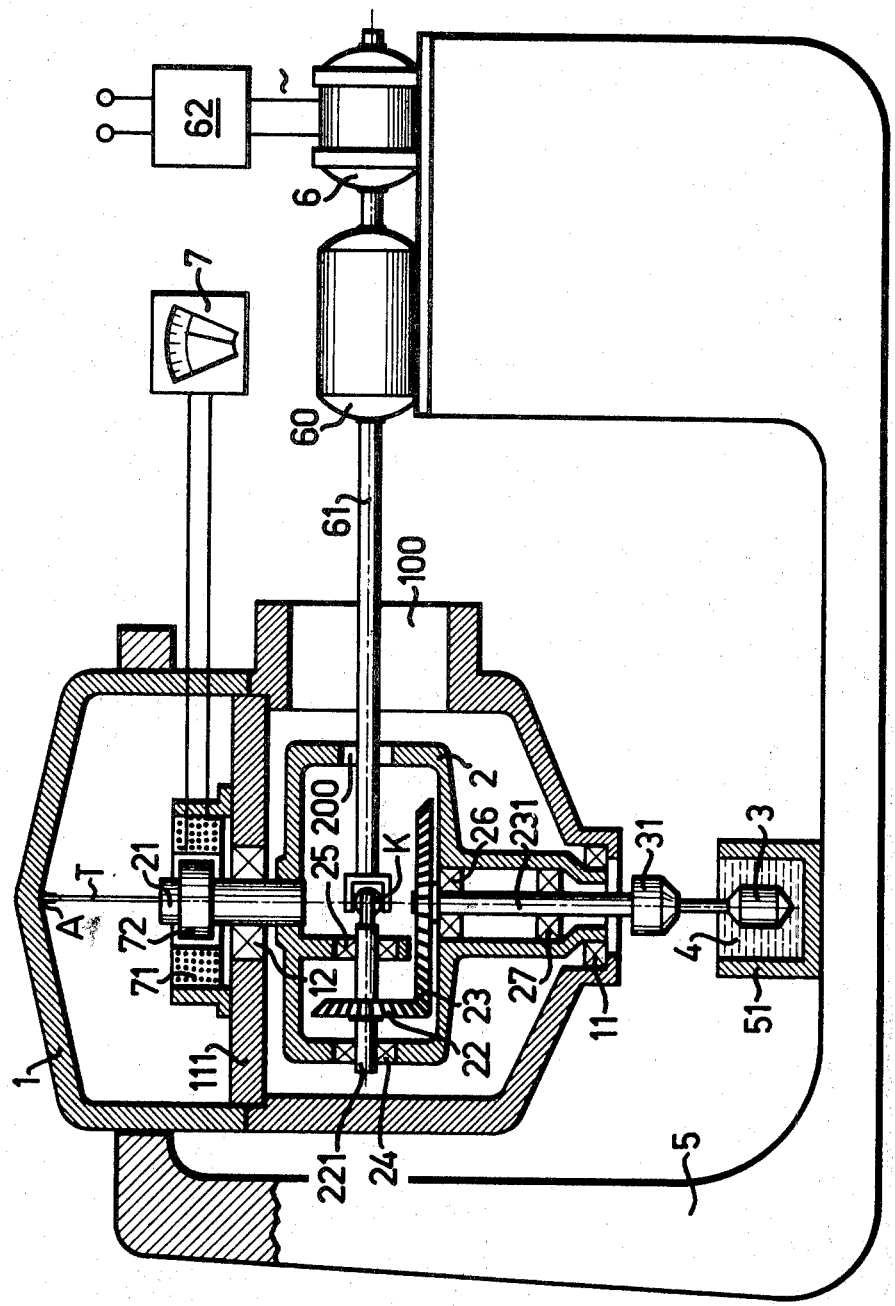

3,533,275
VISCOSIMETER
Georg Zemp, Zurich, Switzerland, assignor to Contraves AG, Zurich, Switzerland, a corporation of Switzerland
Filed Mar. 13, 1969, Ser. No. 806,850
Claims priority, application Switzerland, Mar. 25, 1968, 4,401/68
Int. Cl. G01n *11/10*
U.S. Cl. 73—59                               7 Claims

ABSTRACT OF THE DISCLOSURE

A viscosimeter incorporating a measuring body member driven to perform constant rotational movement and immersed in the substance to be measured, thereby experiencing braking moments which in the form of moments of reaction rotate a gear or transmission housing, rotatable about the axis of rotation of the measuring body member, out of the null-position against restoring forces and producing a measurable physical magnitude representing a measure or value for the viscosity of the substance to be measured. The gear housing contains gearing, such as miter gearing, the power-takeoff shaft of which drives the measuring body member and is disposed in the axis of rotation of the gear housing, and the drive shaft of which is disposed substantially perpendicular to the power-takeoff shaft. The drive shaft is connected via a coupling, the center of rotation of which is disposed at the point of intersection of both shaft axes, with a drive motor which is stationarily arranged externally of the gear housing.

BACKGROUND OF THE INVENTION

The present invention relates to an improved viscosimeter equipped with a measuring body member driven for constant rotational movement which is immersed in the substance to be measured or analyzed and thereby experiences braking moments which, in the form of reaction moments, rotate a gear or transmission housing, likewise rotatable about the axis of rotation of the measuring body member, out of the null-position against restoring forces and generate a measurable physical magnitude which provides a measure or value for the viscosity of the substance to be measured.

Viscosimeters of this type are suitable for the simple and accurate determination of the viscosity of fluids in a large range of values. Under the term "fluids" as used in the context of this disclosure, there should be also understood substances possessing fluid-like or flowable properties.

Prior art viscosimeters were constructed such that, for instance, a synchronous electric motor with series connected transmission or gearing was rotatably mounted in the viscosimeter housing. Such construction is associated with certain limitations with regard to the size of the motor and the transmission for a desired sensitivity. The switching of the transmission or gearing during selection of the rotational speed requires expensive constructions. Furthermore, the number of rotational speeds available for the measuring body member is likewise limited. In addition to these difficulties, the current supply means or conductors for the rotatably mounted elements provide further sources of measurement errors. In the case of sensitive measuring instruments only expensive constructions of the current supply means are satisfactory.

SUMMARY OF THE INVENTION

Accordingly, it is a primary object of the present invention to provide an improved viscosimeter which effectively overcomes the aforementioned drawbacks of the prior art constructions.

Another, more specific object of the present invention relates to an improved viscosimeter which is extremely sensitive and capable of accurately determining the viscosity of substances throughout a relatively wide range of viscosity values.

Still a further significant object of the present invention relates to the provision of an improved viscosimeter of the mentioned type which provides for considerably greater possibilities in the selection of the drive motor and the gearing or transmission for regulating the rotational speed.

According to the present invention, the drive or motive power for the actual rotatably mounted measuring system is generated by means of an externally mounted and stationarily arranged drive motor and transmission. There are dispensed with the requirements for a weight-and-space-saving construction. The number of selectable rotational speeds can be optionally expanded.

With a universal or Cardan coupling as the connection means between the drive shaft and the power-takeoff shaft, wherein these shafts are not located in a straight line, the rotational speed of the power-takeoff shaft does not remain constant with constant rotational speed of the drive shaft. This variation of the rotational speed of the power-takeoff shaft—and therefore the measuring body member—can be, however, limited through the selection of the torisonal strength of a torsion rod or bar such that the maximum angle of rotation is very small. Consequently, this variation of the rotational speed becomes negligible.

Now, more precisely according to the present invention, it is contemplated for the new and improved viscosimeter that the gear or transmission housing contain miter gearing, the power-takeoff shaft thereof which rotates the measuring body member is located in the axis of rotation of the gear or transmission housing, and the drive shaft of which is disposed perpendicular to the power-takeoff shaft. Furthermore, this drive shaft is operatively connected with a drive motor via a coupling, the center of rotation of which is situated at the point of intersection of both aforementioned shaft axes. Additionally, such drive motor is stationarily arranged externally of the gear or transmission housing. It is also here mentioned that as the lubricating agent for the coupling there can be used any suitable conventional nonelastic oil.

BRIEF DESCRIPTION OF THE DRAWING

The invention will be better understood and objects other than those set forth above, will become apparent, when consideration is given to the following detailed description thereof. Such description makes reference to the annexed drawing wherein the single figure schematically depicts in sectional view a preferred embodiment of inventive viscosimeter.

DESCRIPTION OF THE PREFERRED EMBODIMENT

Describing now the drawing, it will be understood that the illustrated exemplary embodiment of inventive viscosimeter embodies a viscosimeter housing 1 equipped with the plate member 111. A gear or transmission housing 2 with the shaft member 21 is rotatably mounted in the viscosimeter housing 1 in the bearings 11 and 12. The shaft member 21 is secured to a torsion bar or rod T which, in turn, is rigidly connected at point A with the viscosimeter housing 1, as shown. The torsional strength of the torsion bar T can be chosen such that the maximum angular deflection of the gear housing 2 from its starting or null position does not exceed 5°.

Continuing, it will be recognized that the gear or transmission housing 2 contains suitable gearing, namely the miter gearing disposed at right angles to one another and incorporating the bevel gears 22 and 23 provided with the drive shaft 221 and the power-takeoff shaft 231, respectively. These shafts 221 and 231 are mounted in the bearings 24, 25 and 26, 27, respectively. The driven or power-takeoff shaft 231 of the miter gearing is disposed in the extension of the axis of the torsion rod or bar T and in or at the axis of rotation of the gear or transmission housing 2. A measuring body member 3 is detachably and exchangeably connected by means of the universal coupling 31 with the driven or power-takeoff shaft 231.

Furthermore, a measuring container or vessel 51 which houses the substance 4 to be analyzed or measured, just as is the case with the viscosimeter housing 1, is fixedly supported at a stand or support arrangement 5. Since the viscosity of a fluid is a value dependent upon temperature, there are also provided conventional means for regulating the temperature of the substance 4 to be analyzed as well as the measuring container or vessel 51, but since such means do not form part of the inventive concepts disclosed herein and are not required to understand the teachings of the invention, they have been conveniently omitted from the drawing.

Continuing, it should be noted that at the point of intersection of the axes of the drive shaft 221 and the driven or power-takeoff shaft 231, this drive shaft 221 is connected via a Cardan or universal coupling K with the Cardan shaft 61 leading towards the outside through the bores 100 and 200. The Cardan shaft 61 is driven by a stationary drive motor 6. Between the drive motor 6 and the Cardan shaft 61 there can be operatively connected a transmission 60 for selecting the rotational speed of the measuring body member 3. If the drive motor 6, for instance, is a synchronous electric motor, then the rotational speed of the drive motor 6 can be also varied and fixedly adjusted by means of a suitable frequency transmitter 62.

If the measuring body member 3 immersed in the substance 4 to be measured rotates, then such is subjected to a braking moment. The rotatably mounted gear or transmission housing 2 experiences, in the form of a reaction force, a deflection out of its initial or null position. The angle of deflection is a measure for the braking moment and, therefore, also for the viscosity of the measured-substance 4 and can be, for instance, indicated or measured ta a suitable indicating device by means of an appropriate electromagnetic "pick-off" 71, 72, defining an electro-mechanical angle transmitting device 7. The gear or transmission housing 2 provided with the miter gearing 22, 23 should be advantageously constructed in such a way that its center of gravity is disposed in its axis of rotation.

It should be apparent from the foregoing detailed description, that the objects set forth at the outset of the specification have been successfully achieved. Accordingly,

What is claimed is:

1. A viscosimeter comprising a driven measuring body member which carries out a constant rotational movement, said driven measuring body immersing into the substance to be measured and therefore during rotation experiencing a braking moment, a gear housing mounted for rotation about the axis of rotation of said measuring body member, means for applying a restoring force to said gear housing, the braking moment experienced by said measuring body member serving in the form of a reaction moment to rotate said gear housing out of its null position against the restoring force and producing a measurable physical magnitude which provides a measure for the viscosity of the substance, said gear housing being provided with gearing means, including a miter gearing arrangement, a drive shaft member and a power-takeoff shaft member, said power-takeoff shaft member rotating said measuring body member and being disposed substantially at the axis of rotation of said gear housing, said drive shaft member being disposed substantially perpendicular to said power-takeoff shaft member, a drive motor stationarily arranged externally of said gear housing, coupling means for connecting said drive shaft member with said drive motor, said coupling means possessing a center of rotation which is disposed at the point of intersection of the axes of both of the aforesaid shaft members.

2. A viscosimeter as defined in claim 1, wherein said coupling means comprises a Cardan coupling for providing a driving connection between said drive motor and said drive shaft member.

3. A viscosimeter as defined in claim 1, further including means for selectively adjusting the rotational speed of said measuring body member.

4. A viscosimeter as defined in claim 1, wherein said means for applying said restoring force comprises torsion rod means to which there is attached said gear housing.

5. A viscosimeter as defined in claim 1, further including means for generating an electrical measurement signal, said generating means comprising an electromechanical angle transmitting device.

6. A viscosimeter as defined in claim 1, wherein said restoring force-applying means controls the deflection of said gear housing from its null position such that it is limited to a maximum of 5°.

7. A viscosimeter comprising a measuring body member driven to carry out a substantially constant rotational movement, said driven measuring body member immersing into the substance to be measured and during rotation experiencing a braking moment, gear housing means mounted for rotation about the axis of rotation of said measuring body member, the braking moment experienced by said measuring body member serving in the form of a reaction moment to rotate said gear housing means out of its null position against a restoring force and producing a measurable physical magnitude which represents a measure for the viscosity of the substance, said gear housing means being provided with gearing means, including a drive shaft member and a power-takeoff shaft member, said power-takeoff shaft member rotating said measuring body member and, being disposed substantially at the axis of rotation of said gear housing means, said drive shaft member being disposed substantially perpendicular to said power-takeoff shaft member, a drive motor arranged externally of said gear housing means, and means for coupling said drive shaft member with said drive motor, said coupling means comprising a Cardan coupling.

References Cited

UNITED STATES PATENTS

| | | | |
|---|---|---|---|
| 2,076,816 | 4/1937 | Hess | 73—59 |
| 2,457,247 | 12/1948 | Lawshe | 73—59 |
| 2,679,157 | 5/1954 | Carpenter | 73—59 |
| 2,977,790 | 4/1961 | Dubsky et al. | 73—60 |
| 3,079,787 | 3/1963 | Van Luik | 73—59 |

FOREIGN PATENTS 1,034,216  6/1966  Great Britain.

LOUIS R. PRINCE, Primary Examiner

J. W. ROSKOS, Assistant Examiner